(12) United States Patent
Hirschburger et al.

(10) Patent No.: US 7,455,088 B2
(45) Date of Patent: Nov. 25, 2008

(54) MANUAL ROUTING MACHINE

(75) Inventors: Wolfgang Hirschburger, Reutlingen (DE); Frank Fuchs, Rutesheim (DE); Martin Kraus, Filderstadt (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 10/555,479

(22) PCT Filed: Feb. 21, 2005

(86) PCT No.: PCT/EP2005/050741

§ 371 (c)(1),
(2), (4) Date: Nov. 3, 2005

(87) PCT Pub. No.: WO2005/095036

PCT Pub. Date: Oct. 13, 2005

(65) Prior Publication Data

US 2006/0251485 A1    Nov. 9, 2006

(30) Foreign Application Priority Data

Mar. 30, 2004   (DE)   ........................ 10 2004 016 172

(51) Int. Cl.
*B27C 5/10* (2006.01)

(52) U.S. Cl. ..................... 144/136.95; 144/154.5; 144/48.5; 144/252.2; 409/182

(58) Field of Classification Search ............ 144/136.95, 144/154.5, 252.1, 252.2; 83/100; 30/124; 451/357, 359, 449, 451, 456; 409/182

See application file for complete search history.

(56) References Cited

U.S. PATENT DOCUMENTS

| | | | |
|---|---|---|---|
| 3,208,722 A | | 9/1965 | Rodriquez et al. |
| 3,677,351 A | | 7/1972 | Geissler |
| 3,722,147 A | * | 3/1973 | Brenner ..................... 451/359 |
| 3,932,055 A | | 1/1976 | Flatland |
| 4,051,880 A | * | 10/1977 | Hestily ..................... 144/252.1 |
| 4,281,457 A | * | 8/1981 | Walton, II ..................... 30/124 |
| 4,898,524 A | * | 2/1990 | Butzen ..................... 418/136 |
| 5,044,034 A | * | 9/1991 | Iannucci ..................... 15/1.7 |
| 6,146,066 A | * | 11/2000 | Yelton ..................... 409/134 |
| 6,203,415 B1 | * | 3/2001 | Torrance-Castanza et al. ............ 451/359 |
| 6,347,985 B1 | | 2/2002 | Loveless |
| 6,609,881 B2 | | 8/2003 | Brown et al. |
| 2003/0121680 A1 | | 7/2003 | Izumisawa et al. |

FOREIGN PATENT DOCUMENTS

| | | |
|---|---|---|
| CN | 2345150 | 10/1999 |
| CN | 1420257 | 5/2003 |
| GB | 9005 | 6/1916 |

* cited by examiner

*Primary Examiner*—Shelley Self
(74) *Attorney, Agent, or Firm*—Michael J. Striker

(57) ABSTRACT

A hand router has a housing (12) and a tool (22) situated in the housing in a rotary drivable fashion, which it is possible to operate in the intended manner by means of a suction air flow, in particular by means of a vacuum cleaner. The hand router is particularly powerful because a radial turbine wheel (32) equipped with intake and outlet gratings (44, 48) is used as the drive. The housing (12) is made up of tube-like sections (13, 14, 15), in particular that can be grasped by an operating hand, which it is possible to connect with one another by means of flanges (36, 38).

7 Claims, 4 Drawing Sheets

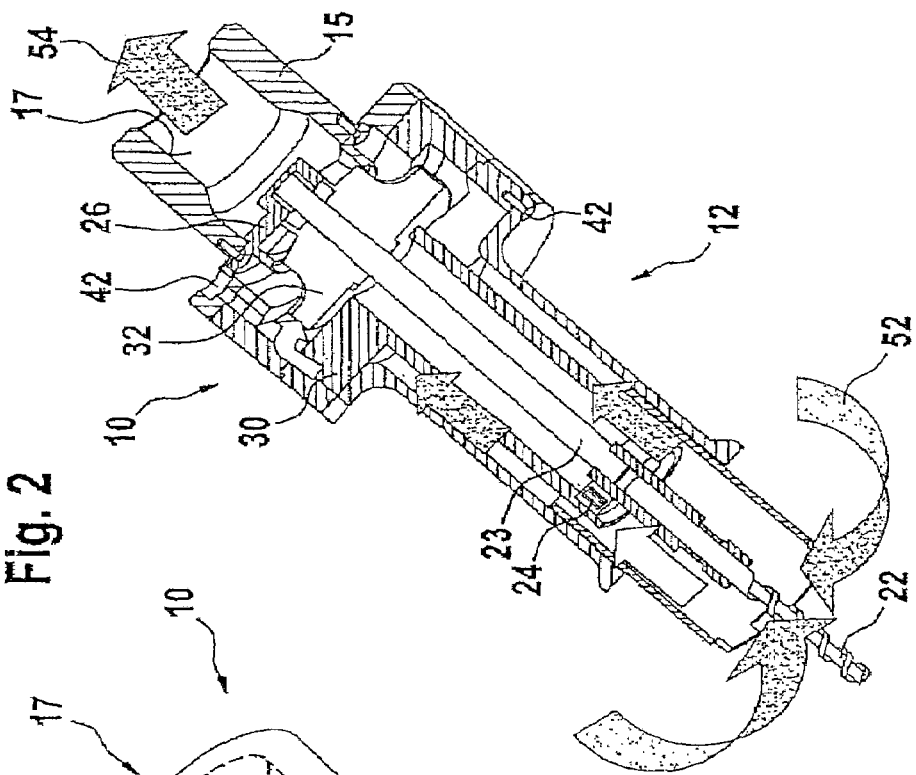
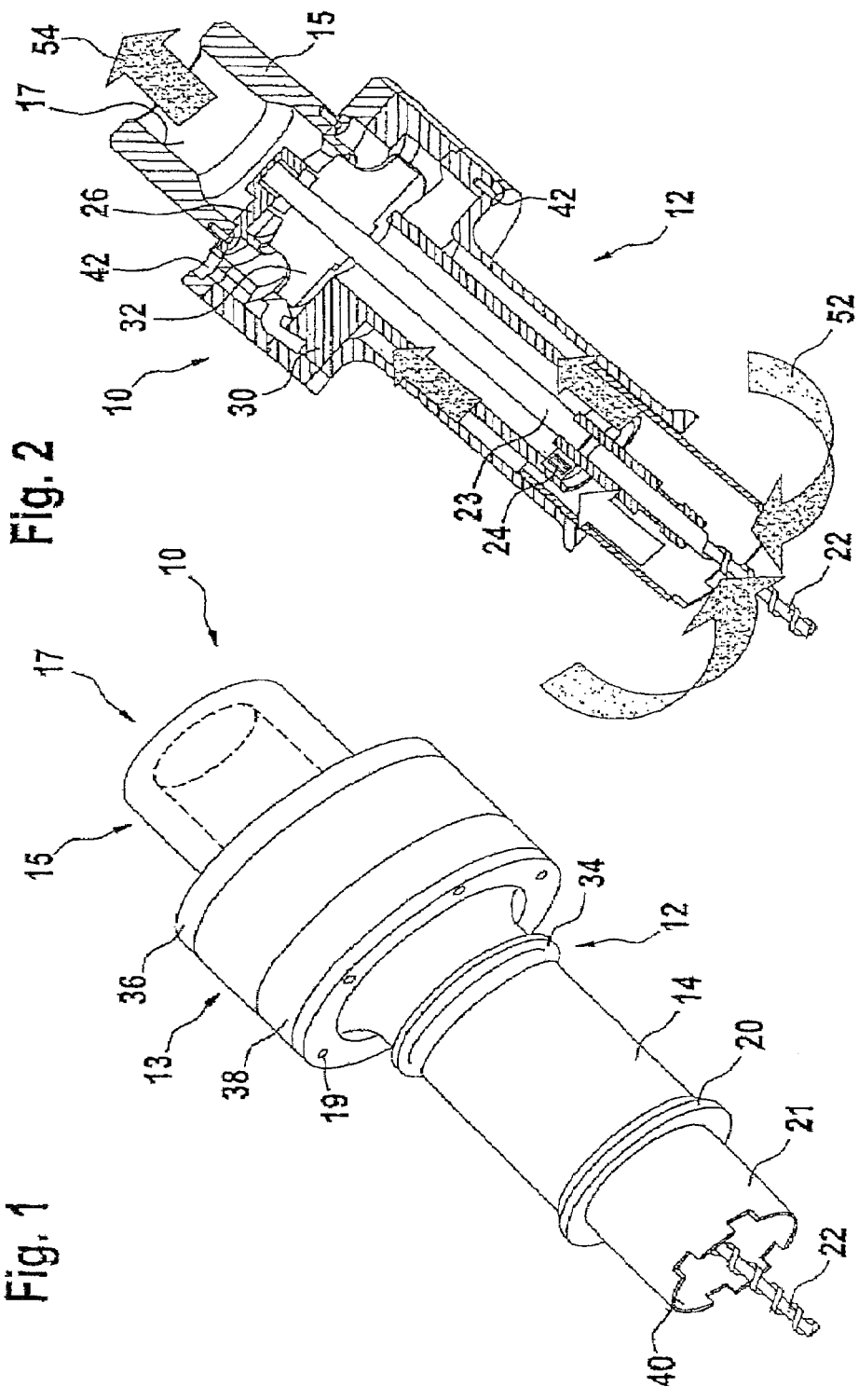

MANUAL ROUTING MACHINE

CROSS-REFERENCE

The invention described and claimed hereinbelow is also described in PCT/EP 2005/050741, filed Feb. 21, 2005 and DE 10 2004 016172.0, filed Mar. 30, 2004. This German Patent Application, whose subject matter is incorporated here by reference, provides the basis for a claim of priority of invention under 35 U.S.C. 119 (a)-(d).

BACKGROUND OF THE INVENTION

The present invention relates to a hand router.

U.S. Pat. No. 6,347,985 B 1 has disclosed a hand-guided power tool that can be driven solely by means of the suction air flow of a vacuum cleaner. The core of this hand-guided power tool is a conventional Pelton turbine, which uses the suction air of the vacuum cleaner to turn the drive spindle and thus drive the tool.

The efficiency of conventional axial and Pelton turbines is not high enough to allow conventional vacuum cleaners to achieve the performance and suction power required for a hand router.

SUMMARY OF THE INVENTION

The present invention has the advantage that the driving of the hand router without its own electric motor, only with the suction air of a vacuum cleaner is of such a high efficiency that when connected to a conventional vacuum cleaner and during routing, particularly of gypsum boards, an effective suction of the grinding dust is achieved at the same time.

A particularly flat drive unit with an improved, sufficient performance is achieved by using a Pelton turbine provided with an inlet grating as an alternative drive unit of the hand router.

Since the inlet and outlet grating are integrated into the housing structure of the hand router, they are particularly inexpensive to manufacture.

The fact that the outlet grating is embodied with curved vanes permits the suction air to be conveyed away with a low flow resistance, which increases the efficiency of the turbine.

Since the outlet grating serves as a retainer for the upper bearing of the turbine wheel, the function of two components is combined into a single component.

The fact that the drive is essentially comprised of plastic parts makes the hand router particularly light and easy to handle.

Keeping the suction air flow used to drive the radial or Pelton turbine separate from the air flow used to vacuum away the grinding dust gives the radial or Pelton turbine equipped with the inlet grating a particularly long service life because the grinding dust does not come into contact with its moving parts and these parts are not damaged by the abrasive action of the grinding dust.

The quantity of grinding dust coming into contact with the turbine wheel and the moving parts or their bearing points can be kept to an extremely small amount by drawing the drive air for the turbine in through lateral slots that are situated at the top of the housing, far away from the production of grinding dust.

Providing the hand router with a radio or infrared switch that is able to switch the vacuum cleaner on and off makes it convenient and easy to operate the hand router and the vacuum cleaner.

Since the speed control for the hand router is carried out with a variously adjustable air valve, the tool speed can be easily and inexpensively adapted to the respective existing conditions.

Constructing the housing of the hand router of tubular parts that can be attached to one another via flanges makes it particularly dimensionally stable and rugged with a low specific weight.

Providing the lower end of the grip region of the housing with a clear sleeve that encompasses the tool permits the tool to perform routing work in a safe, precisely controllable fashion.

Because the lower edge of the clear sleeve follows a meandering course, it is always possible for air to be sucked in from the outside, which assures the uninterrupted removal of dust directly at the tool and assures that no routing dust escapes into the air around the operator.

Since the grip region of the housing has a guard ring beneath the intake openings, this prevents the intake openings from being inadvertently blocked by an operating hand during router operation, which would reduce the efficiency of the router.

Since the diameter of the grip region corresponds to that of a vacuum cleaner hose, the hand router can be guided in the operating hand with particular ease and precision—almost as well as a writing implement.

The fact that the underside of the motor housing or a guard ring fits snugly and in a supported fashion in the operating hand in the working position of the hand router allows the hand router to be guided with particular ease and precision.

BRIEF DESCRIPTION OF THE DRAWINGS

The present invention will be explained in detail below in conjunction with an exemplary embodiment and the accompanying drawings.

FIG. 1 is a three-dimensional side view of a hand router,

FIG. 2 is a three-dimensional longitudinal section through the hand router according to FIG. 1.

DETAILED DESCRIPTION OF THE EXEMPLARY EMBODIMENT

Figure 3:
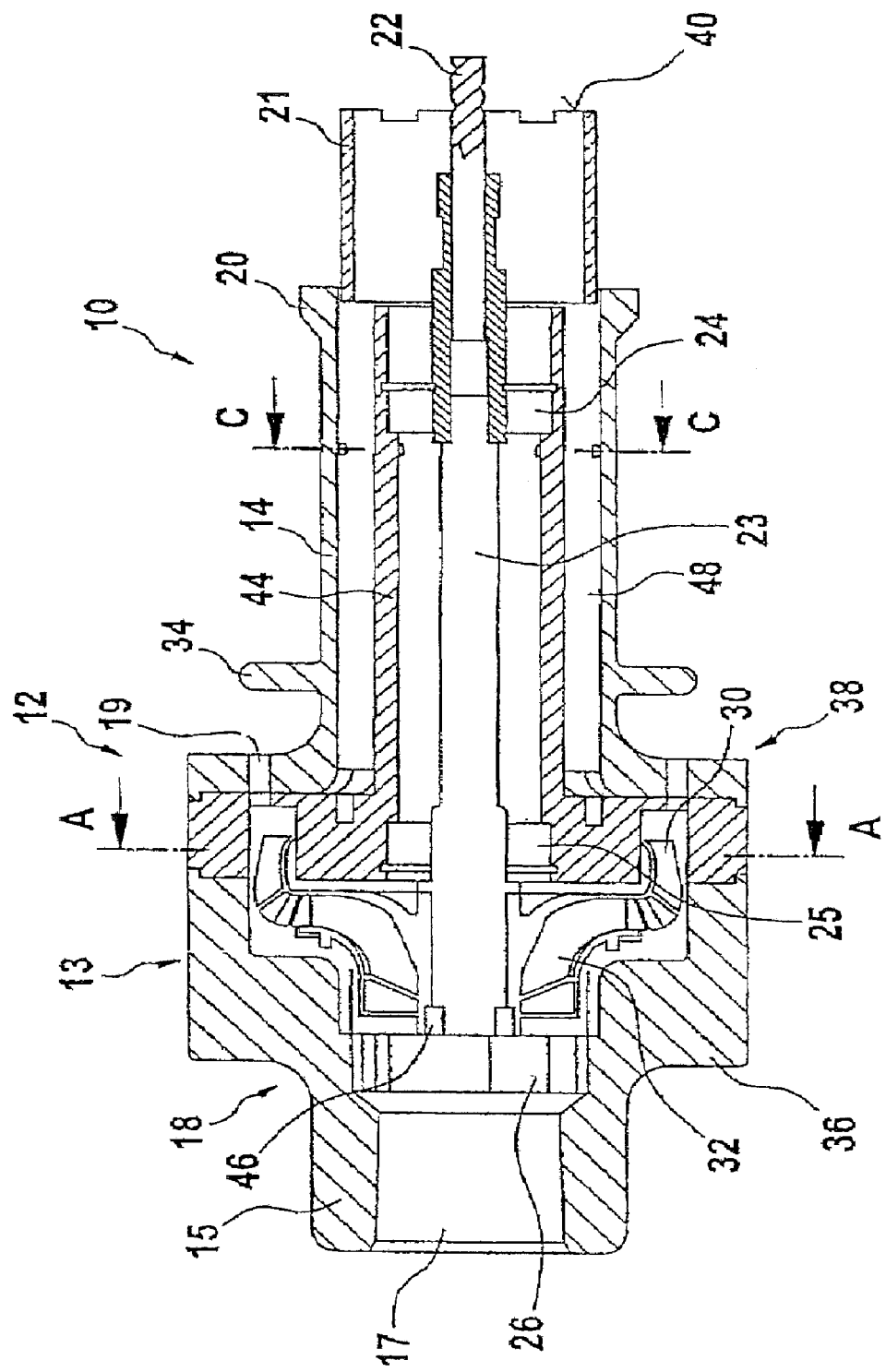
FIG. 3 is a longitudinal section through the hand router.

FIG. 1 shows a hand router 10 with a housing 12 whose top is embodied as an exhaust fitting 15 in the form of a narrow, tubular part, which is adjoined at the bottom in a stepped cylindrical fashion by a motor housing 13 in the form of a thicker, short, tubular, flange-mountable part, which is adjoined at the bottom by an oblong, narrow, tubular part that serves as a grip region 14. At the bottom, the grip region 14 ends at a straight, lower edge with an annular bead 20 on which the operating hand can rest toward the bottom, secured against slippage, when operating the hand router 10.

From the bottom of the hollow, cylindrical grip region 14, a clear sleeve 21 extends, which concentrically encompasses a cutter 22 supported by the output shaft 23 and permits precise control of the cutter 22 during cutting work. The lower edge 40 of the clear sleeve 21 is not straight, but instead follows a meandering course so that during routing, as the lower edge 40 rests against the work piece, a sufficient amount of replenishing air is always able to flow into the clear sleeve 21, thus assuring the uninterrupted removal of dust.

The output shaft 23 is driven to rotate by a turbine wheel 32, which is embodied in the form of a radial or Pelton turbine wheel. It is supported at the bottom in a roller bearing 24 in the grip region 14 and is supported at the top in a needle bearing 25 in the hub 27 of the outlet grating 26.

In its middle region, the drive shaft 23 is encompassed in a non-rotating fashion by the turbine wheel 32 and must therefore follow its rotation. The turbine wheel 32 has a bell-shaped outer contour that is encompassed snugly, i.e. with a small gap, by a stationary inlet grating 30 that calms or reduces turbulence in the incoming suction air used for driving the radial turbine wheel 32 34 and thus significantly improves the efficiency of the turbine on the inlet side.

The remaining parts of the motor housing 13 encompass the turbine wheel 32 with a narrow gap, which, at the top, at the axial end of the turbine wheel 32, transitions into an exhaust opening 17 extending straight up. At the beginning of this opening, the upper end of the turbine wheel 32, together with the output shaft 23, rests axially against an outlet grating 26, which serves as a bearing seat of the upper roller bearing 25 of the output shaft 23. To that end, the outlet grating 26 is embodied in the shape of a star or a wagon wheel, whose hub-like middle part 27 supports the needle or roller bearing 25 of the output shaft 23 and air-conveying elements 28 embodied in the form of spokes or vanes extending radially out from it connect the middle part 27 to an outer support ring 260. Between the spoke-like air-conveying elements 28, there are intermediate spaces 29 to permit the passage of used drive air, which has been generated by an external vacuum cleaner.

The air-conveying elements 28 of the outlet grating 26 calm the exhaust air emerging axially from the turbine wheel 32 in a vertically upward direction so that it then flows without significant flow losses and with minimal turbulence through the flow-favorably designed exhaust opening 17 and into a vacuum cleaner hose, not shown, that can be connected to the exhaust opening 17 so as to assure the continuous operation of the turbine wheel 32.

In order to operate the hand router 10, air flows through the intake openings 19 on the underside of the motor housing 13, through the inlet grating 30, to the turbine wheel 32, and on to the outlet grating 26, before mixing with the dust-laden dust suction air. The dust suction air, which carries away the dust ejected from the cutting channel of the cutter 22, is conveyed via bypass conduits 48, around the turbine wheel 32 without touching it, to the exhaust opening 17 and from there, is transported via the vacuum cleaner hose, into a dust receptacle that is not shown.

The separation of the turbine wheel 32 from the dust-laden air counteracts an abrasion and accretion effect that would reduce the performance of the radial turbine and shorten its service life.

FIG. 2 shows a sectional view of a hand router 10 similar to the one in FIG. 1, but without a guard ring 34 and without separate intake openings, and with an air routing that leads to a direct contact of the turbine with dust-laden air. In this drawing, the following details are clearly visible in comparison to the assembled view shown in FIG. 1:

The upper region 15 of the housing 12 functions as an exhaust fitting and, with a mushroom head-like expansion, constitutes a lower flange 38 and an upper flange 36, which is screwed to the shorter, thicker tubular motor housing 13 by means of flange screws 42. The outlet grating 26 is situated between the housing parts 15, 13 and radially encompassed by them.

In a middle region, the outer contour of the drive shaft 23 is embodied in the form of an external hexagon 231 and serves to engage in a form-locked manner with the adjacent turbine wheel 32 situated axially underneath the inlet grating 30.

The inlet grating 30 encompasses the radial turbine wheel 34 with the drive shaft 23 concentrically and is provided for non-rotating installation in the tubular motor housing 13. In this position, it deflects the replenishing air, which flows in axially from below, radially inward to the middle of the turbine wheel 32, where it can exert its work with improved efficiency.

Inside the housing parts 15, 13, the outlet grating 26 is supported at the bottom against the inlet grating 30 in a captive, play-free fashion.

FIG. 3 shows another longitudinal section through a hand router 10 in an embodiment that has been modified in relation to those in FIGS. 1 and 2. By contrast with the embodiment of the hand router 10 in FIGS. 1 and 2, the output shaft 23 has three bearing points. The lower and middle bearing points 24, 25 are situated at the bottom and in the middle in the tubular, inner housing tube 44 and the upper one is situated in a needle bearing 46 in the hub 27 of the outlet grating 26.

The dust-laden air is combined with the dust-free "used" drive air in the region of the exhaust opening 17 and is conveyed to the vacuum cleaner. Flow elements for calming or reducing turbulence in the air in the combining region of the two types of air are not shown.

The intake openings 19 on the underside of the motor housing 13 are particularly visible; the guard ring 34 is embodied in the form of a part integrated into the grip region 14 and once again serves in the same way to prevent the operating hand from inadvertently blocking the intake openings 19 when it comes too close to the underside of the motor housing 13. The guard ring 34 can also be fitted as a separate part into a corresponding annular groove of the grip region 14.

Figure 4:
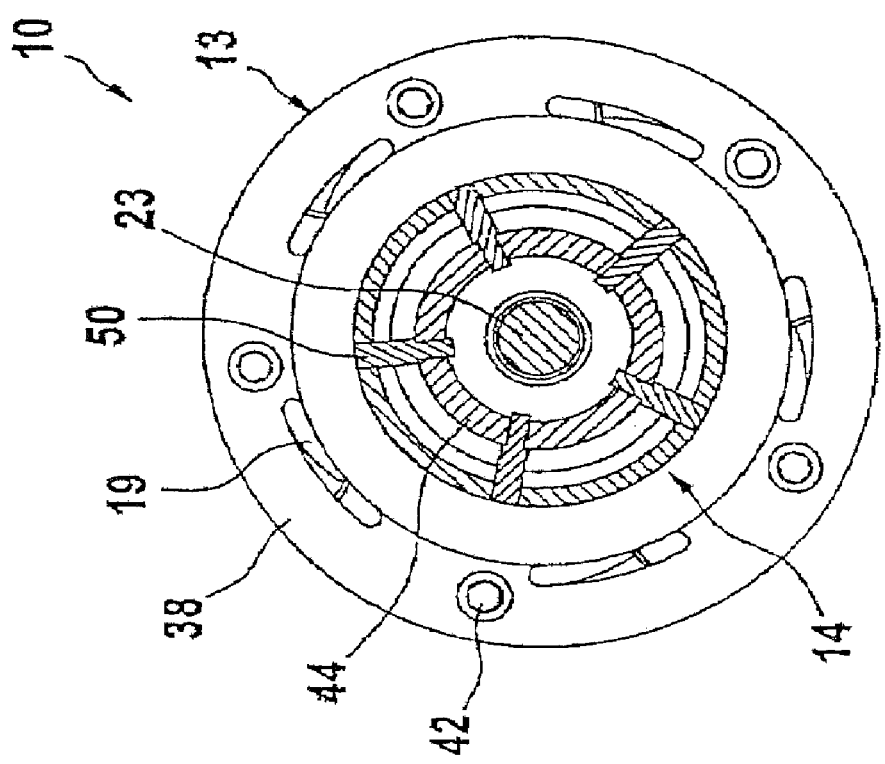
FIG. 4 is a cross section through the hand router in the grip region.

FIG. 4 shows a cross section through the grip region 14, which is embodied as an outer tube with a central, inner tube 44, which is fixed in its position spaced radially apart from the outer tube by means of spoke-like spacing slats 50.

At the bottom of the motor housing 13, slot-like or oblong hole-like intake openings 19 are visible, through which the low-dust air used for driving turbine wheel 32 is drawn.

Figure 5:
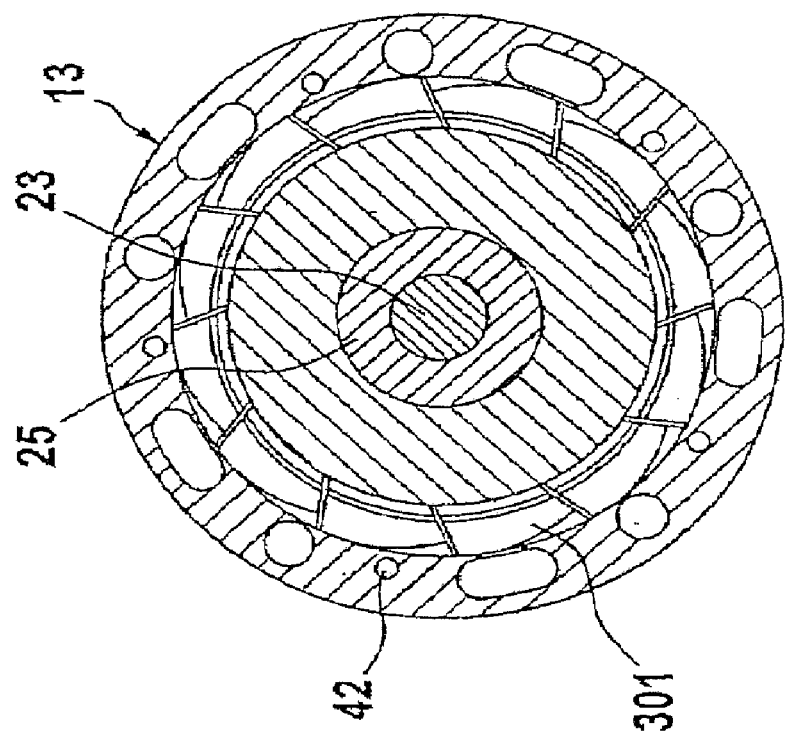
FIG. 5 is a cross section through the hand router in the motor housing.

FIG. 5 depicts another cross section through the hand router 10 in the region of the motor housing 13, showing the air-conveying elements 301 of the inlet grating 30 and the threaded holes for flange screws 42 that connect the motor housing 13 axially to the grip region 14. In addition, oval bypass openings 48 are also visible, through which the dust-laden air is conveyed around the turbine wheel 32 to the exhaust fitting 15.

Figure 6:
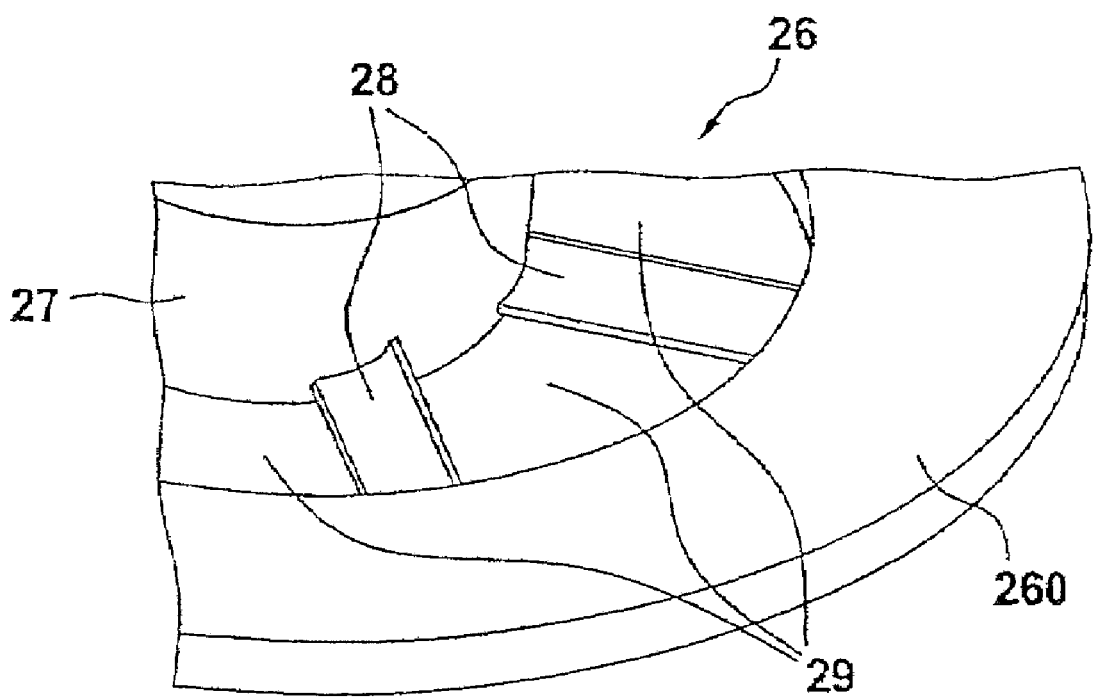
FIG. 6 shows a detailed view of an outlet grating of the hand router.

FIG. 6 depicts a detail of the outlet grating 26, showing the support ring 260 at the outside, the regularly arranged spoke-like air-conveying elements 28, the intermediate spaces 29, and the hub-like middle part 27.

In an exemplary embodiment of the hand router that is not shown, in a manner similar to the preceding exemplary embodiments, the housing of the hand router has a radio or infrared switch that communicates with a counterpart switch associated with the vacuum cleaner and is able to switch the vacuum cleaner on and off, giving the hand power tool a convenient and inexpensive design. In addition, in order to regulate the speed and output, a button is provided within reach of the operating hand for gradually opening and/or closing a throttle valve that can open or close the intake air flow and/or that opens a bypass opening between the turbine and the vacuum cleaner hose, thus reducing the drive energy for operating the turbine wheel.

What is claimed is:

1. A hand router (10), comprising:

a housing (12);

a tool (22) attached to the housing in a rotary drivable fashion, said tool being parallel to a longitudinal axis of the housing (12), wherein the tool is a drill bit or router bit operable for cutting or routing with means for suction air flow;

a drive disposed within the housing, wherein a suction air-drivable turbine with a radial or Pelton turbine wheel (32) is used as the drive within the housing (12), wherein said turbine is provided with means for calming air flowing in said turbine wheel (32) or flowing out of said turbine wheel (32), whereby the means for calming air are comprised of an inlet and an outlet grating (30, 26), the housing (12) being comprised of a number of tubular parts (13, 14, 15);

flange means for connecting said tubular parts with one another, and wherein one of the tubular parts (14) in a lower region of the housing (12) encompasses the tool (22) concentrically, wherein the outlet grating (26) has air-conveying elements (28) configured as curved vanes, and wherein the inlet grating (30) and the outlet grating (26) each are incorporated into a motor housing (13) in a manner that reinforces the housing (12).

2. The hand router as recited in claim 1, wherein the outlet grating (26) is configured as a bearing seat for the turbine wheel (32).

3. The hand router as recited in claim 1, wherein the means for suction air flow is configured so that the suction air flow comprised of low-dust air used for driving the turbine wheel (32) is routed separately from a dust air flow so that dust-laden air sucked from a work piece does not come into contact with moving parts of the hand router or parts of the hand router that convey a driving air.

4. The hand router as recited in claim 1, wherein said housing (12) includes air inlet openings, wherein said air inlet openings are configured to allow air used for driving the turbine wheel (32) to be drawn into the housing (12) toward said turbine wheel (32), wherein said air inlet openings are disposed in the housing at a position above and spaced from the tool (22).

5. The hand router as recited in claim 1, wherein the housing (12) has a radio switch, wherein said radio switch is configured to actuate a counterpart switch, wherein said counterpart switch is configured to switch the means for suction air flow on and off, whereby the hand router is switchable on and off at the same time.

6. The hand router as recited in claim 1, further comprising a switch for adjusting an operating speed of the hand router, wherein said switch for adjusting the operating speed is configured as an operating button coupled to a throttle valve situated in the suction air flow.

7. The hand router as recited in claim 1, wherein the housing has a grip region and means for securing an operating hand against slippage.

\* \* \* \* \*